Sept. 18, 1956          F. D. DOLAN          2,763,802
PORTABLE MOTOR TOOL AND METHOD OF ASSEMBLING SAME
Filed July 8, 1955          6 Sheets-Sheet 1

INVENTOR.
Francis D. Dolan
BY Owen & Owen
ATTORNEYS

Sept. 18, 1956 F. D. DOLAN 2,763,802
PORTABLE MOTOR TOOL AND METHOD OF ASSEMBLING SAME
Filed July 8, 1955 6 Sheets-Sheet 2

INVENTOR.
Francis D. Dolan
BY Owen & Owen
ATTORNEYS

Sept. 18, 1956   F. D. DOLAN   2,763,802
PORTABLE MOTOR TOOL AND METHOD OF ASSEMBLING SAME
Filed July 8, 1955   6 Sheets-Sheet 3

INVENTOR.
Francis D. Dolan
BY Owen & Owen
ATTORNEYS

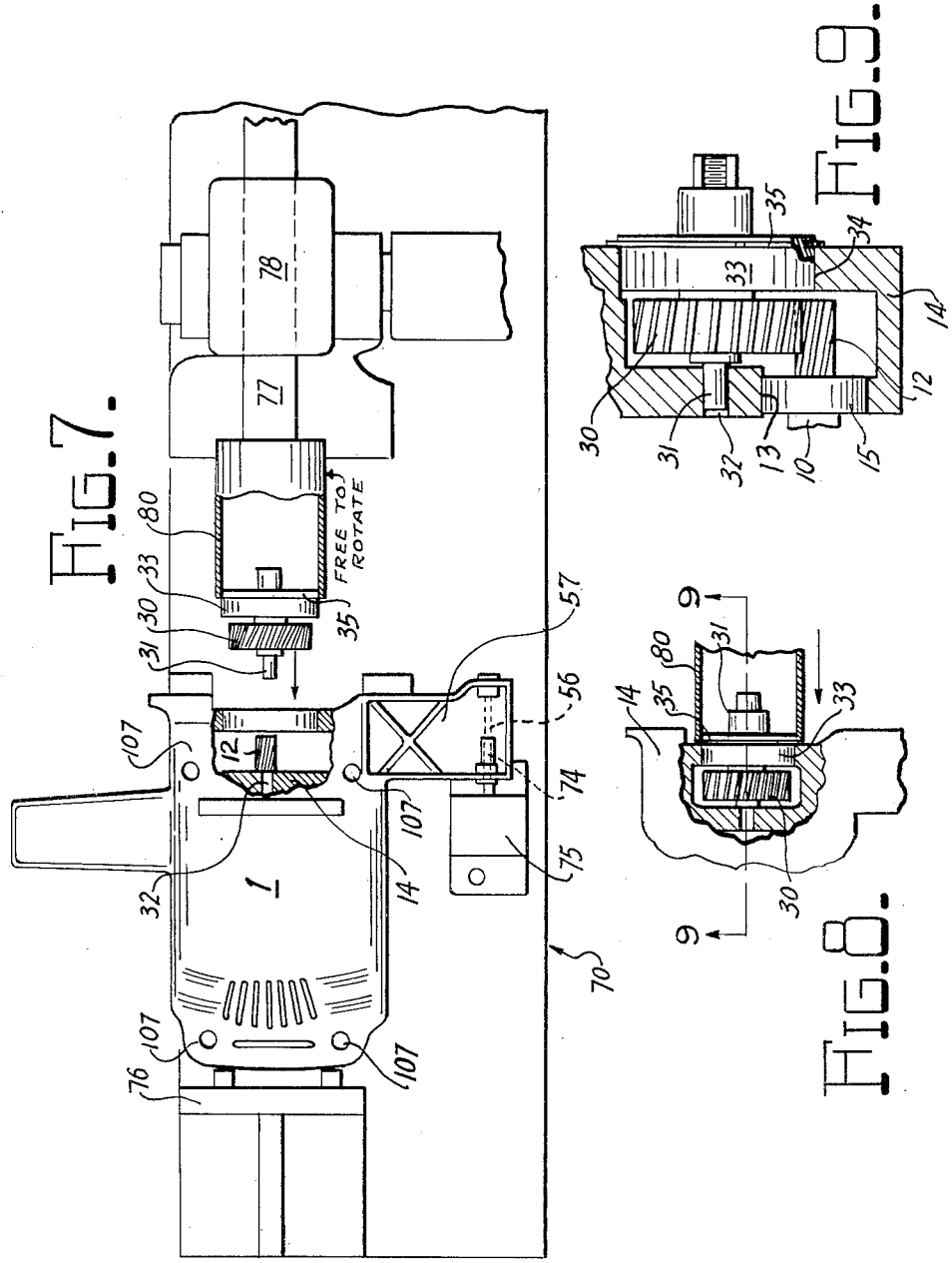

Sept. 18, 1956  F. D. DOLAN  2,763,802
PORTABLE MOTOR TOOL AND METHOD OF ASSEMBLING SAME
Filed July 8, 1955  6 Sheets-Sheet 5
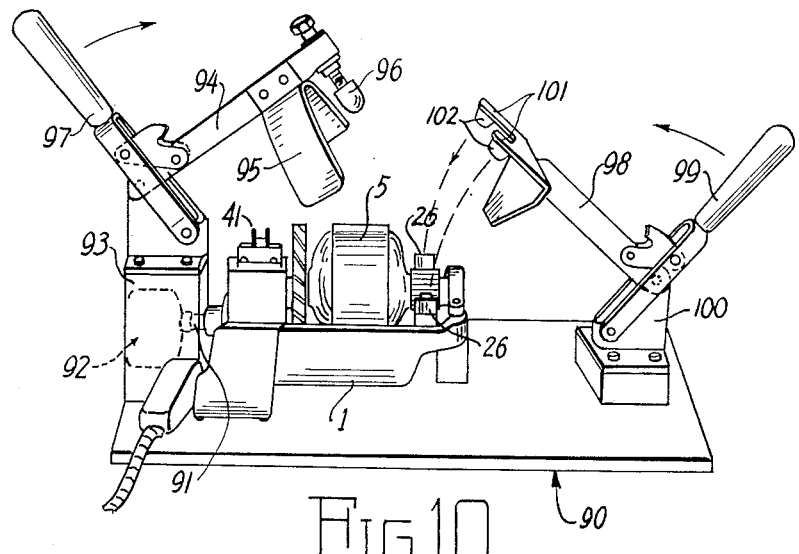
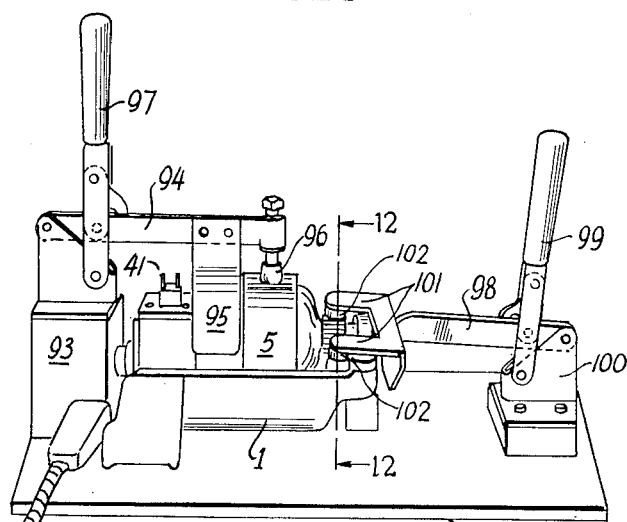
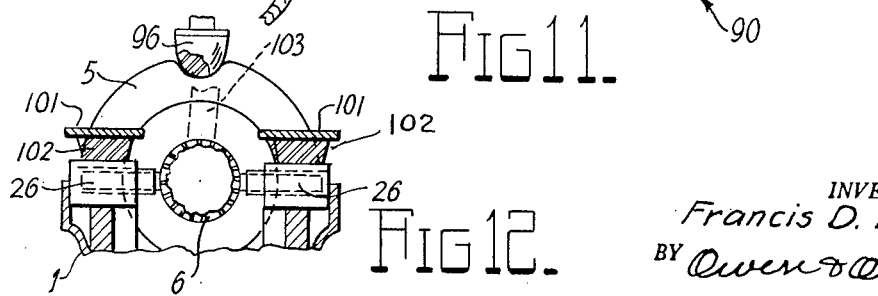
INVENTOR.
Francis D. Dolan
BY Owen & Owen
ATTORNEYS

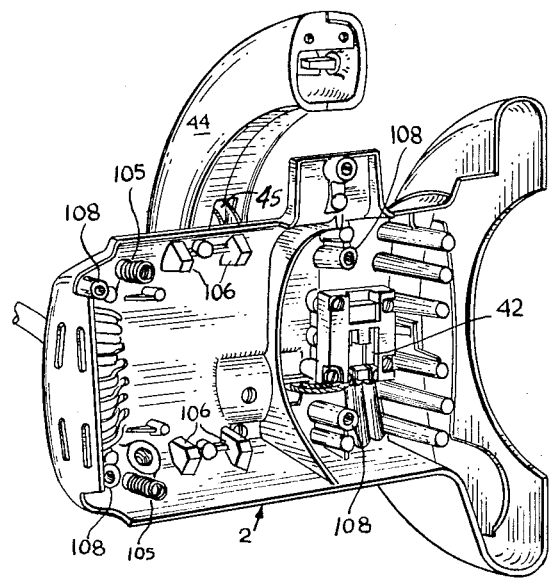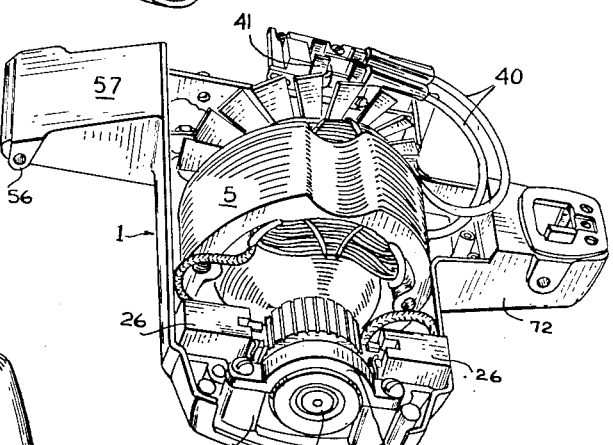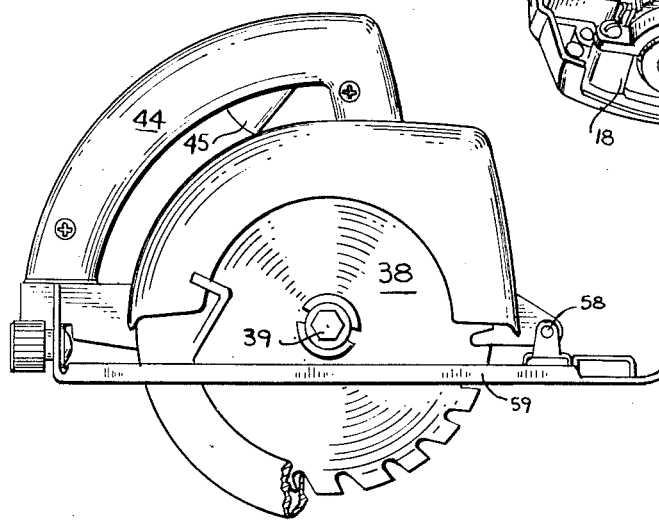

United States Patent Office 2,763,802
Patented Sept. 18, 1956

2,763,802

PORTABLE MOTOR TOOL AND METHOD OF ASSEMBLING SAME

Francis D. Dolan, Toledo, Ohio, assignor to The American Floor Surfacing Machine Company, Toledo, Ohio, a corporation of Ohio Application July 8, 1955, Serial No. 520,894

5 Claims. (Cl. 310—255)

This invention relates to electric hand machines such, for instance, as hand power saws, and to a method of assembling the interior parts thereof.

An object of the invention is the provision of a tool of this character having a two-part housing in which the motor parts are mounted in a simple, novel and efficient manner, and wherein a pluarlity of ball bearing sets for the rotating parts are mounted, some in axially aligned position and others in offset relation, whereby to enable the parts to be assembled in a simple, rapid and efficient manner.

Another object of the invention is the provision of a novel method of assembling the motor and its various parts and bearings in the separable housing of a tool of the class described whereby the work may be accomplished in a simple, rapid, efficient and inexpensive manner.

Further objects and advantages of the invention will be apparent from the following detailed description and from the accompanying drawings illustrating an apparatus embodying the invention and the method of mounting the motor parts in the housing, and in which—

Fig. 7 is an enlarged plan view of said last-mentioned jig with the lower housing section, after the first assembling operation, mounted therein in position for receiving a driven gear and ball bearing unit carried by the jig, with parts broken away;

Fig. 8 is a fragmentary view of the bottom housing section, with parts broken away to expose the positioning of the tool driving spindle, its gear and roller bearing therein;

Fig. 9 is an enlarged fragmentary section of the gear box, with the gearing and shaft bearings mounted therein;

Fig. 10 is a perspective view of the jig used in the third assembling operation, with the lower housing section and parts carried thereby mounted therein but not held by the associated clamping means;

Fig. 11 is a similar view with the clamping parts lowered in clamping position;

Fig. 12 is an enlarged fragmentary section on the line 12—12 in Fig. 11;

Fig. 13 is a perspective inner side view of the top housing section;

Fig. 14 is a perspective view of the lower housing section and parts mounted therein preparatory to having the top cover section mounted thereon, and Fig. 15 is an end view of a power hand saw embodying the invention.

Figure 1:
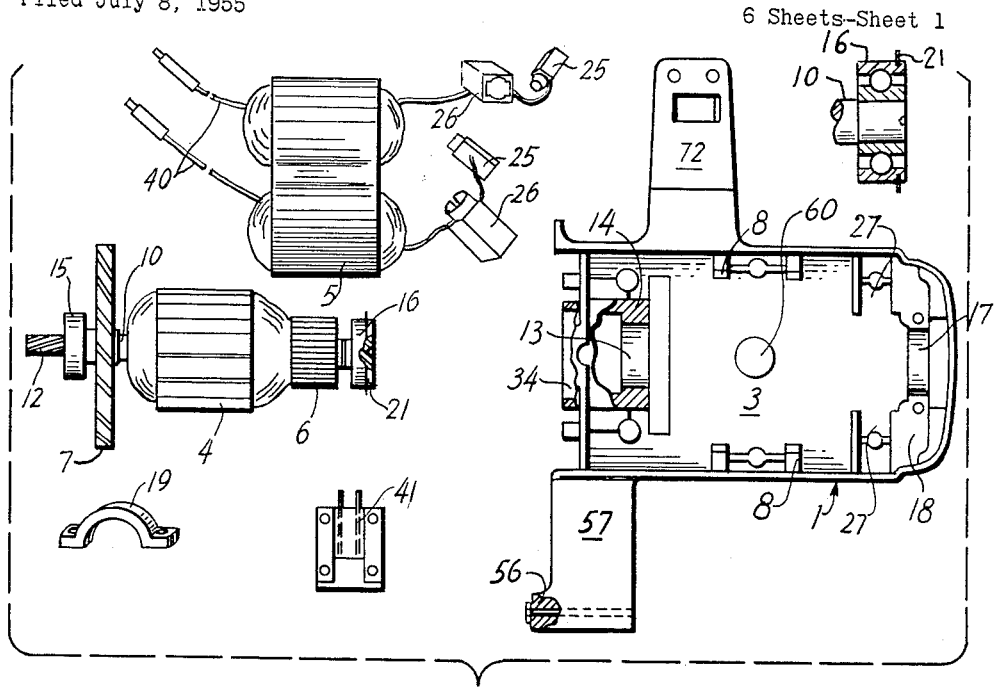
Fig. 1 is a separated view of the lower housing member and the parts to be mounted therein, with parts broken away.

The shell or housing in which the motor and associated parts, including the shaft bearings, brushes and tool driving countershafts are mounted, comprises, in the present instance, a bottom half or section 1 (Fig. 1) and an upper half or section 2 (Fig. 13). The bottom section 1 has a cavity or space 3 intermediate its ends in which the motor armature 4, its field winding and ring 5, commutator 6 and ventilating fan 7 are disposed, with the field ring resting in proper position on supporting lugs 8 in the lower portion of the cavity 3. The shaft 10 on which the armature, commutator and fan are mounted, has its power output end provided with or forming a spiral gear 12, and this is projected through a bearing opening 13 into a gear box portion 14 located at the adjacent end of the section 1. Mounted on the shaft 10 inwardly from the gear 12 is a ball bearing set 15 the outer ring of which has a pressed fit mounting in the bearing opening 13.

The opposite end of the shaft 10, or that adjacent to the commutator 6, carries a ball bearing set 16, the outer ring of which rests in a half bearing seat 17 formed in a cradle 18 in the housing section end (Fig. 1). This bearing ring is retained in the seat 17 by a half circular yoke or saddle 19 the ends of which rest on the cradle at the sides of the bearing seat and are secured thereto by screws 20. The outer ring of the bearing 16 has a split flange ring 21 set therein adjacent to its outer end and this bears against the outer side of the cradle 18 and also against the outer wall of a circular recess provided lengthwise in the inner side of the yoke 19 to center and prevent endwise movement of the bearing in the bearing seat. The gear box 14 projects above the division line of the sections and the axis of the shaft 10.

The commutator 6 is located adjacent to and at the inner side of the cradle 18 and the commutator brushes 25, one at each of diametrically opposite sides of the commutator, are mounted in and projected from the adjacent ends of respective brush holders 26 that seat freely in open top notches or sockets 27 that are radial to the commutator and are open at their inner ends for the brushes to project through. As is customary, the brushes are spring pressed to yieldingly hold their outer ends in contact with the commutator. The sockets 27 are located at the ends of the cradle 18 at their inner sides and the brushes have flexible connection with the field coils. The brush holders are yieldingly held in the sockets when the top housing section 2 is mounted on the bottom section, as hereinafter described.

Figure 5:
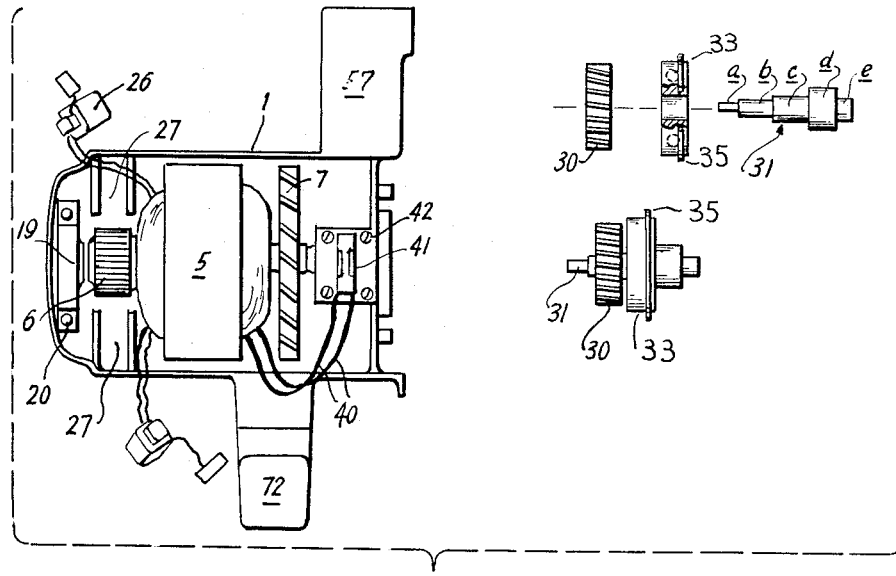
Fig. 5 is a view of the separated parts which are to be assembled in the second operation.

A mating gear 30 for the drive gear 12 is mounted in the gear box 14 therewith on a spindle 31 the axis of which is parallel to and laterally offset from the axis of the armature shaft 12. The spindle 31 fits in a bearing opening 32 in the inner wall of the box 14 (Fig. 9) and at the outer side of the gear 30 carries a ball bearing set 33 the outer ring of which has a pressed fit in a bearing opening 34 in the outer side wall of the gear box 14. The opening 34 and bearing set 33 are larger than the diameter of the gear 30 to permit the latter to be freely inserted through the opening. A split ring 35 is mounted in a circumferential groove in the outer edge portion of the outer bearing ring of bearing set 33 and engages the marginal edge wall of the opening 34 to limit the extent of projection of the bearing therein. The spindle 31 is preferably stepped, as shown in Fig. 5, to provide a small inner end a for entering the gear box bearing opening 32, and the successively larger portions b and c on which the gear 30 and bearing set 33 are respectively mounted. The spindle also has the still larger portion d that shoulders against the bearing set 33. The outer end of the part $d$ is reduced as at $e$ and may be polygonal in cross-section to fit, in the present instance, in the center opening of a rotary disk saw 38 (Fig. 15), which is held thereon by a screw 39.

The field leads 40 have a severable connection with the circuit wires (not shown) so that the circuit is automatically broken when the two housing sections 1 and 2 are separated. This separable connection, in the present instance, is of the knife type with one member, indicated at 41, mounted on the top of the gear box 14 and with the other member, indicated at 42 (Fig. 13), mounted interiorly of the section 2 in position to make contact with the member 1 when the sections are placed together. The electrical control switch for the tool, in the present instances, is located in the handle 44 on the top section 2 and its control finger is indicated at 45 in Figs. 13 and 15.

Figure 2:
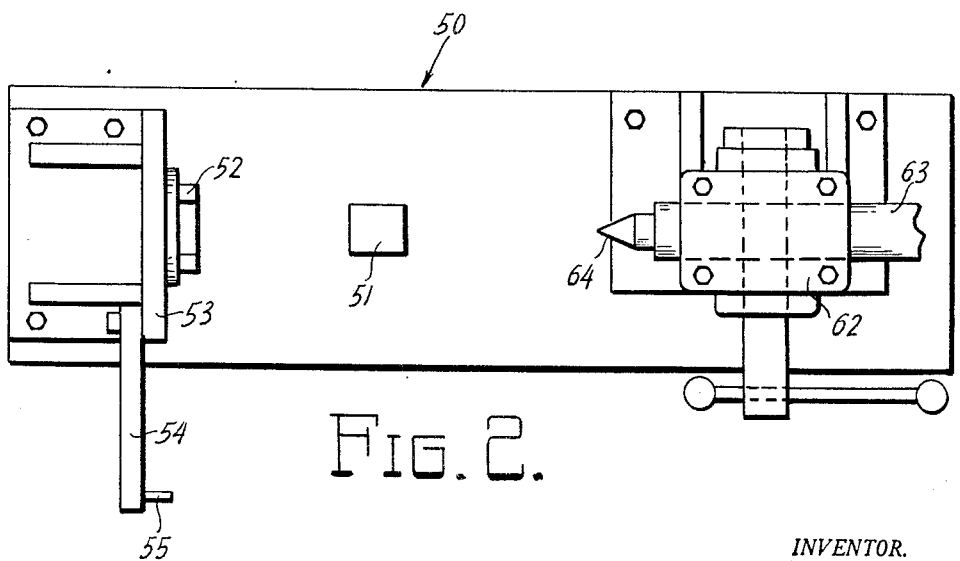
Fig. 2 is a plan of a jig used in the first assembly operation of the parts in the lower housing section.
Figure 4:
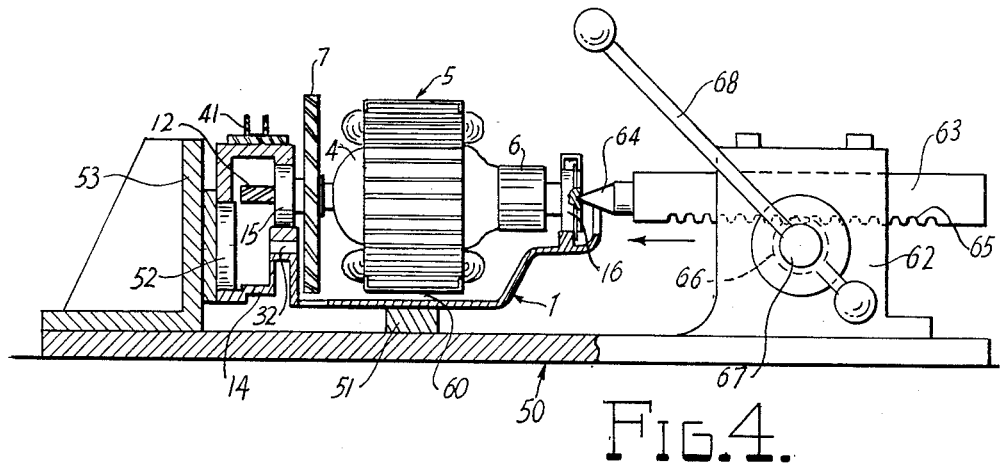
Fig. 4 is a section taken on the line 4—4 in Fig. 3.
Figure 3:
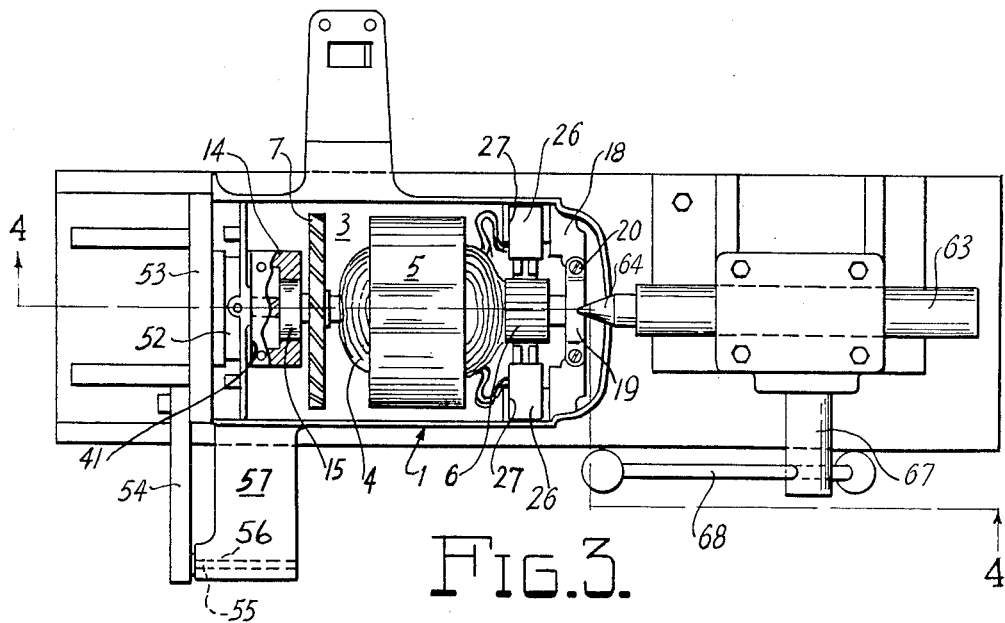
Fig. 3 is a top plan view of the jig with some of the motor parts mounted therein and illustrating the first assembling operation.

In the first assembly operation, the lower shelf section 1 is placed in a jig 50 (Fig. 2) with its inner or hollow side up, with its lower side resting intermediate its ends on a supporting boss 51, and with its gear box bearing opening 34 fitting over a centering boss 52. This boss is carried by a plate 53 at the left end of the jig. Projecting laterally from one end said plate is an arm 54 having a forwardly projecting pin 55 that enters a registering hole 56 in an arm 57 that projects from the adjacent side of the shell section 1, as shown in Figs. 4 and 5. The hole 56 receives the pivot pin 58 (Fig. 15) on which the housing is tilted relative to the base plate 59 when mounted thereon and when raising or lowering the housing and its saw 38 to vary the depth of cut. The housing section 1 is thus held centered and prevented from lateral turning relative to the jig.

The housing section 1, having been mounted in the jig, the assembled motor unit, comprising the armature 4, field winding and ring 5, commutator 6, fan 7 and opposite end bearings 15 and 16, is positioned endwise in the section with the field ring 5 resting on a boss 60 and on bosses 8 in the bottom of the section cavity 3, and also with the bearing set 15 in axial register with the bearing box opening 13 and with the rear bearing set 16 resting with its outer ring partially in position in the housing bearing 17 in the cradle 18.

The jig 50 has at its rear end a standard 62 in which a plunger 63, having a centering thrust pin 64 at its forward end, is mounted for reciprocatory movement axially of the shaft 10. A set of rack teeth 65 is provided on the underside of the plunger to adapt it to act as a rack-bar, and these teeth are engaged by a rack pinion 66 on a cross-shaft 67 in the standard. An operating slide bar 68 is carried by the shaft 67 to facilitate operation.

The assembled motor unit having been positioned in the section 1, as above described, the plunger 63 is moved forward to cause the pin 64 to enter a centering depression in the motor shaft end and then to force such shaft forward to press the outer ring of the bearing set 15 into the bearing opening 13 and to project the worm 12 in proper position in the gear box 14. At the same time the rear bearing set 16 is properly positioned in the cradle bearing 17. The limit of forward movement of the shaft 10 and its bearings is determined by the stop flange 21 on the rear bearing set, striking the outer marginal edge of the bearing 17. When the motor unit has thus been mounted in the housing section 1, and while the section is mounted in the jig, the operator places the circuit connector member 41 on the top of the gear box 14 and secures it thereto by screws 42 (Figs. 4 and 5).

Figure 6:
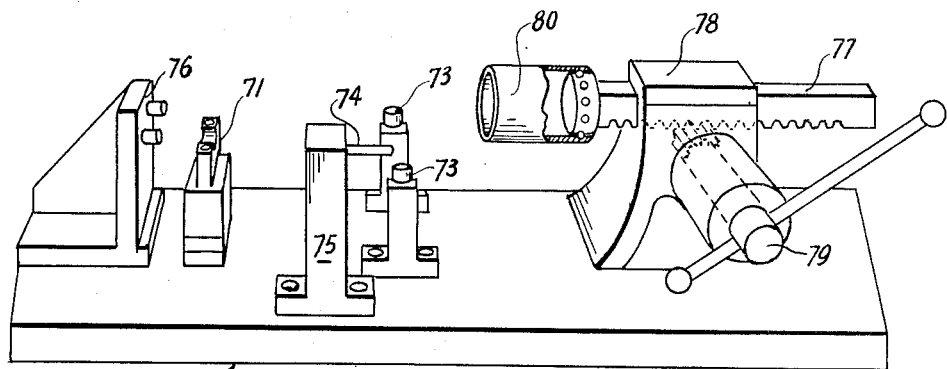
Fig. 6 is a perspective view of a jig used in said second assembling operation.

The operator now removes the assembled housing section 1 and motor unit from the jig 50 and places the assembly in a jig 70 (Figs. 6 and 7) with the open side of the section 1 facing downward and with its gear box end directed rearward, or, in the present instance, to the right. In this position the bearing yoke 19 rests on a support cradle 71, with opposite side edge portions of the housing section resting on supports 73, with the hole 56 in the arm 57 receiving a positioning pin 74 on the standard 75, and with the section in forward end thrust engagement with the jig standard or abutment 76. A plunger 77 is mounted in a standard 78 at the rear of the jig for forward and rearward reciprocatory movements actuated by a rack and pinion connection with a hand operated shaft 79. The plunger 77 axially registers with the bearing receiving opening 34 in the outer side of the gear box 14 and carries at its free end a sleeve 80 for free rotation on the plunger in axial alignment therewith and with its forward end open. The assembled gear and bearing unit, comprising the spindle 31, gear 30 and ball bearing set 33, is now engaged with the sleeve 80 by inserting the bearing set 33 in its outer open end to the limit permitted by the split ring 35 and with the gear 30 disposed forwardly for insertion through the axially registering bearing opening 34 in the gear box. The shaft 79 is now turned to force the sleeve 80 forward to project the gear into the bearing box in mesh with the drive pinion 12, with the spindle projected into the box bearing 32 and with the bearing set 33 press-fitted into the box opening 34, the limit of such movement being determined by the engagement of the split ring 35 with the marginal edge wall of the opening 34, as indicated in Figs. 7, 8 and 9. As the gear 30 is forced endwise into mesh with the spiral teeth of the pinion 12, it is permitted to turn due to the free turning of the sleeve 80 on the plunger 77.

The housing section 1 with its assembled parts is now removed from the jig 70 and placed, motor side up, in a jig 90 (Figs. 10 and 11) where the brush holders 26 are positioned in the housing recesses 27 with the enclosed brushes 25 in proper end thrust contact with the commutator 6. In this position the spindle 31 is in driven connection with a shaft 91 of an electric drive motor 92 located in or associated with an end standard 93 of the jig. An arm 94 is pivoted on the standard 93 and is adapted to be swung rearward over the motor field ring 5. This arm has a guard 95 for protecting the fan 7 and an adjustable pressure foot 96 for seating on the motor ring 5 and firmly holding the assembly when the arm is lowered. A hand lever 97 is also pivoted to the standard 93 and has link connection with the arm 94 whereby a rearward swinging of the lever will force the arm down into holding engagement with the assembly. A similar arm 98 and operating lever 99 are pivoted to a standard 100 at the rear of the assembly, and the arm has a pair of fingers 101 provided with pressure pads 102 which bear down on the brush holders 26 and hold them in their seats 27 when the arm is lowered, as shown in Figs. 11 and 12. The arms having been placed in holding positions, the motor 92 is started to cause a turning of the motor shaft 10, and an abrasive 103 (Fig. 12) is held against the commutator 6 to effect a truing and polishing of its surface to cause perfect brush contact.

Upon removal of the assembly from the jig 90, the upper half or cover section 2 of the housing is placed over the lower section and its assembled parts, with the two coiled compression springs 105 (Fig. 13) bearing down on the brush holders 26 to yieldingly hold them seated in the recesses 27, and with the electrical connector member 42 in mating engagement with the companion connector member 41 in the housing section 1. The top section 2 has positioning lugs 106 that bear down on the motor ring 5 and the two sections are firmly connected by screws (not shown) projected through openings 107 in the bottom section 1 and into registering threaded parts 108 in the upper section. The saw 38 is now mounted on the outer end of the spindle 32 and the bottom plate 110 (Fig. 15) is attached to the housing for forward vertical and side tilting movements relative thereto, as understood in the art.

I wish it understood that my invention is not limited to any specific construction, arrangement or form of the parts, as it is capable of numerous modifications and changes without departing from the spirit of the claims.

I claim:

1. An electric hand machine having in combination an elongated housing comprising separable lower and upper sections, the sections being concaved at their inner sides to form longitudinally extending recesses, means at one end of the lower section recess integral with the section and forming one-half of a bearing seat, means at the opposite end of said lower section recess attached to the section and forming a gear box with a full first bearing opening in its inner wall axially aligned with said bearing seat, a second full bearing opening in its rear wall offset laterally from the axis of said first bearing opening, an electric motor mounted in said lower section recess with its armature shaft axial to said bearing seat and said first bearing opening and projected through said opening into said gear box, two ball bearing sets on said shaft, one resting in said bearing seat and the other mounted in said first bearing opening, a gear on said shaft within said gear box, a cradle mounted on said first means and cooperating therewith to hold the bearing set in said seat, a tool driving spindle projected axially through said second bearing opening into said box, a ball bearing set on said spindle mounted in said second opening, and a gear on said spindle within said box and in mesh with said first gear.

2. A combination as called for in claim 1, together with a third bearing opening in the inner wall of said gear box axially aligned with said second bearing opening and receiving and forming a bearing for the inner end of said spindle.

3. A combination as called for in claim 1, wherein said first-mentioned means forms sockets at its inner side radial to said shaft axis and open at top and at their inner ends, brush holders with brushes therein mounted in said sockets and projected inwardly through their inner open ends, a motor armature and field on said shaft within the lower housing section recess, a commutator on said shaft at the inner ends of said brush holders and contacted by the brushes, means on the upper housing section for engaging the top exposed sides of said brush holders to yieldingly retain them in their sockets when the two housing sections are secured together in assembled relation.

4. In an electric hand machine having in combination an elongated housing comprising separable lower and upper sections, the sections being concaved at their inner sides to form longitudinally extending recesses, means at one end of the lower section recess integral therewith and forming one-half of a bearing seat, means at the opposite end of the recess integral with the section and forming a full bearing opening axially aligned with said bearing seat, an electric motor mounted in said recess with its armature shaft axial to said bearing seat and opening, two ball bearing sets on said shaft one resting in said bearing seat and the other mounted in said bearing opening, said first means forming sockets at its inner side radial to said shaft axis and being open at top and at their inner ends, brush holders with brushes therein mounted in said sockets and projected inwardly through their inner open ends, a motor armature on said shaft within the lower housing section recess, a field member surrounding the armature and seating in said lower section, a commutator on said shaft at the inner ends of said brush holders and contacted by the brushes, means on the upper housing section for engaging the top exposed sides of said brush holders to yieldingly hold them in their sockets when the two housing sections are secured together, and a bearing yoke mounted on said first means over the associated ball bearing set and cooperating therewith to prevent axial movements of the shaft relative to said means.

5. An electric hand machine having upper and lower separable sections, the lower section having a motor receiving recess lengthwise in its inner side, means in the lower section at one end forming an open top bearing seat, means at the other end of the lower section integral therewith forming a gear box with a full bearing opening in its inner side wall axially aligned with said sheet, a second full bearing opening in said gear box at its rear side with its axis parallel to and laterally offset from that of said first bearing opening, an electric motor positioned in said recess with its armature shaft projected at opposite ends into said bearing seat and said first mentioned bearing opening, ball bearing sets mounted on each end of the shaft and positioned in said seat and first opening, said bearing sets each comprising inner and outer rings and interposed bearing balls with the inner rings fixed to the shaft and the outer ring stationary in said seat and opening, a tool driving spindle projected through said second bearing opening, a ball bearing set mounting the spindle in said second opening, and gear means in the gear box connecting said shaft and spindle.

References Cited in the file of this patent
UNITED STATES PATENTS

| | | |
|---|---|---|
| 1,651,995 | Casey | Dec. 6, 1927 |
| 2,349,401 | Beckwith | May 23, 1944 |